United States Patent [19]

Johnson et al.

[11] Patent Number: 5,076,727

[45] Date of Patent: Dec. 31, 1991

[54] IN SITU DECONTAMINATION OF SPILLS AND LANDFILLS BY FOCUSSED MICROWAVE/RADIO FREQUENCY HEATING AND A CLOSED-LOOP VAPOR FLUSHING AND VACUUM RECOVERY SYSTEM

[75] Inventors: Paul C. Johnson, Sugar Land; Arthur L. Otermat; Charles C. Chou, both of Houston, all of Tex.

[73] Assignee: Shell Oil Company, Houston, Tex.

[21] Appl. No.: 559,771

[22] Filed: Jul. 30, 1990

[51] Int. Cl.5 ............................................. B09B 1/00
[52] U.S. Cl. .................................. 405/128; 405/131; 405/258
[58] Field of Search ............... 405/128, 129, 131, 258, 405/53; 166/248; 219/10.55 M, 10.57, 10.41; 210/610

[56] References Cited

U.S. PATENT DOCUMENTS

| | | | |
|---|---|---|---|
| 4,401,569 | 8/1983 | Jhareri et al. | 405/128 X |
| 4,518,399 | 5/1985 | Craskell et al. | 405/129 X |
| 4,590,348 | 5/1986 | Lahti et al. | 405/131 X |
| 4,745,850 | 5/1988 | Bastian et al. | 405/128 X |
| 4,765,902 | 8/1988 | Ely et al. | 166/246 X |
| 4,842,448 | 6/1989 | Koerner et al. | 405/258 |
| 4,850,745 | 7/1989 | Hater et al. | 405/128 X |
| 4,973,811 | 11/1990 | Bass | 219/10.57 |

Primary Examiner—Dennis L. Taylor

[57] ABSTRACT

Moist, warm, clean air from a vapor treatment system is injected into wells which are screened only at the contaminated depth forcing vapor flow only through the contaminated region. Intermediate the injection wells is an extraction well which is also screened only at the contaminated depth. A vacuum is drawn on the extraction well drawing the flushing vapors from the injection wells and toward the extraction well through the contaminated soil thereby entraining some of the contaminants. The contaminants are preferably non-volatile hydrocarbons such as diesel fuel, aviation and jet fuel, crude oil or pesticides. The contaminated, flushing vapor is then treated and recycled. An MW/RF heating system heats the earth's surface and the contaminated soil, thereby enhancing volatilization of the contaminants and their removal via the vapor flushing system. By screening the wells only through the contaminated zone and controlling the flow of clean, moist, warm air through only the contaminated zone, thereby maintaining the contaminated zone in a moist state, the entire energy of the system is focussed on the contaminated region.

20 Claims, 3 Drawing Sheets

IN SITU DECONTAMINATION OF SPILLS AND LANDFILLS BY FOCUSSED MICROWAVE/RADIO FREQUENCY HEATING AND A CLOSED-LOOP VAPOR FLUSHING AND VACUUM RECOVERY SYSTEM

FIELD OF THE INVENTION

This invention relates generally to the decontamination of spills and landfills and more particularly to such decontamination in situ using focussed microwave/radio frequency (MW/RF) heating in combination with a closed-loop vapor flushing and vacuum recovery system which maintains the contaminated zone in a moist state.

BACKGROUND OF THE INVENTION

Hazardous waste materials have been improperly deposited in thousands of sites all over the United States and, indeed, all over the world. Uncontrolled landfills have been used as convenient, but inadequate, disposal sites for industrially generated wastes while other sites have been contaminated by accidental spills of hazardous materials. There are many sites where hazardous materials were spilled prior to the discovery of the hazardous nature of the materials being handled. Many hazardous materials found at these sites are stable, do not undergo environmental degradation at reasonably fast rates, have high boiling points, are considered toxic at very low concentration levels, and bio-accumulate in various species of the food chain at concentrations higher than that found in the environment. If left in place, many of these contaminants will find their way into aquifers or into the food supply, and could become public health hazards.

Complete reclamation or isolation of such sites is preferred but the cost associated with site disturbance by available methods has been considered prohibitive. The treatment of contaminated soil from such sites in an incinerator has not been a practical solution for several reasons including the high cost of excavation and incineration, shortage of incineration capacity, inadequate methods and capacity for ash disposal from the incinerators, and the hazards and risks associated with site disturbance and transportation. The treatment of uncontrolled landfills and spills would benefit from an in situ process that eliminates or alleviates these disadvantages and risks. Microwave/radio frequency (MW/RF) heating applied in accordance with and in addition to other features of the present invention offers a viable in situ method for treatment of these contaminated sites.

In situ heating of earth formations by high-frequency displacement currents (dielectric heating) is well known, particularly in the production of petroleum products such as shale oil. Alternatively, heating by conduction currents at relatively low frequencies is also possible, but such heating is limited to earth that remains conductive, generally requiring the presence of water and, hence, operating at relatively low temperatures below the boiling point of water or requiring maintenance of pressure. Conduction heating at very high temperatures for the immobilization of radioactive components in soil is shown in Brouns et al., U.S. Pat. No. 4,376,598, where conductive material was added to the soil to assure conduction, and the soil was heated to vitrification at temperatures as high as 1500° C., whereat radioactive contaminants are fused with the silicates in the soil to form a glass or similar product which, upon cooling, forms a stable mass.

In situ heating of earth formations with RF for hydrocarbon production is shown in Bridges et al, U.S. Pat. No. RE. 30,738 and Kasevich et al, U.S. Pat. No. 4,140,179. The former discloses the use of RF from a "tri-plate" line buried in the earth to heat a block of earth formations uniformly by displacement currents, leading to dielectric heating. The latter discloses radiating RF energy into the earth. In U.S. Pat. No. 4,670,634 a portion of the earth near the surface is decontaminated by selective heating with RF energy from a transmission line array to which the RF energy is bound. That is, there is substantially no radiation from the bound-wave fringing-field transmission line excitor.

Assignee's co-pending application Ser. No. 444,574 filed Nov. 30, 1989 now U.S. Pat. No. 4,973,811 utilizes a different coupling scheme, called "eddy current" or "inductive" coupling which makes use of the magnetic field established rather than the electric fields as disclosed in the prior art RF systems above-described. A current generator is used to drive a transmission line which is shorted at the opposite ends. This method is much better suited to heating highly conductive soils than the fringe field method.

Assignee's co-pending application Ser. No. 427,418 filed Oct. 27, 1989 now U.S. Pat. No. 4,984,594 discloses an in situ method for remediation and decontamination of surface and near-surface soils by evacuating the soil under a flexible sheet, which is impermeable to gases, and heating the soil surface with a relatively flat electric surface heater, which is permeable to gases.

In assignee's co-pending application Ser. No. 427,427 filed Oct. 27, 1989, an in-situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet.

U.S. Pat. No. 4,435,292 discloses a portable system which can be installed at an area where a contaminating spill has occurred. After the area of the contamination has been determined, perforated pipes are inserted into the ground. Some of the wells are pressurized and others are evacuated simultaneously so as to increase the transfer of a flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plant wherein the contaminants are removed.

SUMMARY OF THE INVENTION

Moist warm air from a vapor treatment system is injected into wells which are screened (perforated) only at the contaminated depth forcing vapor flow only through the contaminated region. Intermediate the injection wells is an extraction well which is also screened only at the contaminated depth. A vacuum is drawn on the extraction well forcing the flushing vapors toward the extraction well through the contaminated soil, thereby entraining some of the contaminants. The contaminated, flushing vapor is then treated and recycled. An MW/RF heating system heats the earth's surfaces and the contaminated soil, thereby enhancing volatilization of the contaminants and their removal via the vapor flushing system. By screening the wells only through the contaminated zone and maintaining the contaminated soil zone in a moist state, the entire energy of the system is focussed on the contaminated region.

DETAILED DESCRIPTION OF PREFERRED EMBODIMENTS

Figure 1:
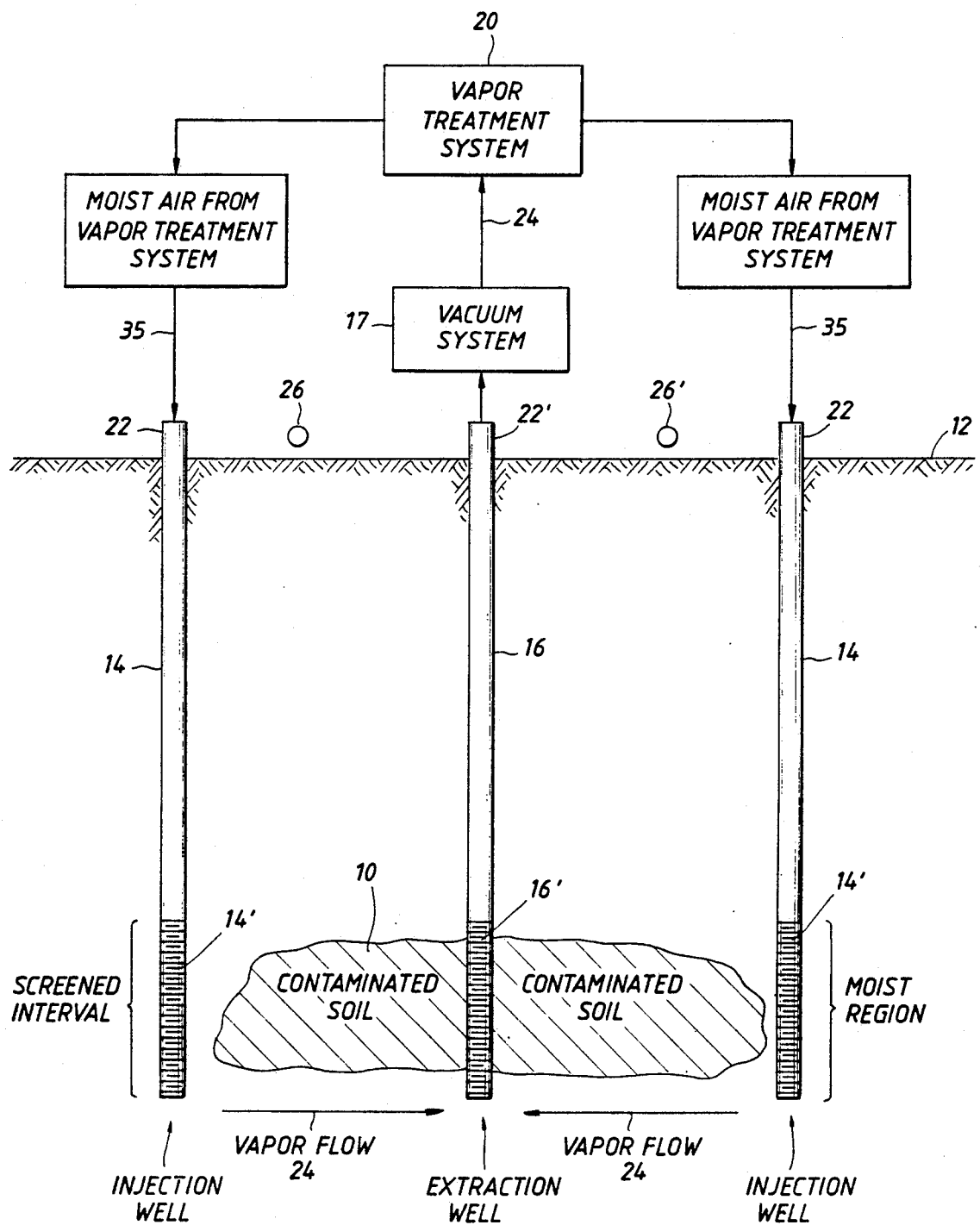
FIG. 1 is a generalized drawing of the invention.

Previously proposed remediation systems utilizing MW/RF heating rely on the natural presence of soil moisture. In those systems, heating of the soil is limited to moist soil regions, and the efficiency and effectiveness of the process are limited by the natural soil moisture distribution. The MW/RF energy absorption, and subsequent heating of the soil are, therefore, not limited or focussed in the zone of contamination. This results in wasted energy and an increase in the cost of treatment. The instant process would be especially useful for the remediation of soils contaminated with non-volatile hydrocarbons, such as diesel fuel, aviation and jet fuel, crude oil, or pesticides. Such problems may be present at refineries, fuel marketing locations, or chemical plants.

The in situ soil remediation system described herein combines and enhances the available technologies of microwave/radio-frequency (MW/RF) heating and in situ soil venting. The process is designed to reduce energy costs and clean-up times for soils contaminated with relatively non-volatile compounds such as diesel fuels, aviation and jet fuels, crude oil, or pesticides.

In this process, hot, moist air from an above ground vapor treatment/moist air generation system is injected into the soil through a well(s) that is screened i.e., perforated only through the contaminated zone. Because the extraction wells(s) is also screened only through the contaminated zone, vapor flows only through this region. The moist air traveling through this zone ensures that the contaminated zone is selectively maintained in a moist state. As MW/RF waves are generated with above ground, or in situ arrays of MW/RF sources, the moist, contaminated soil zone is preferentially heated because energy absorption and heating are significantly greater in moist soils.

By heating the contaminated soil zone, the vapor concentrations of the contaminants are increased. An increase in soil temperature from 16° C. to 100° C. will increase the vapor concentrations of most non-volatile hydrocarbons by a factor of 100. As the contaminants volatilize, they are swept from the soil with the vapor flow induced by the vacuum extraction and injection wells. The vapors are then treated above ground by the treatment system shown in FIGS. 2 or 3.

For this treatment system, it is expected that the energy requirements and operating costs will be substantially reduced in comparison with previous systems, because the above ground vapor treatment/moist air generation system recycles the heat contained within the exhaust vent gases, and also the MW/RF energy is focussed in the zone of contamination.

In contrast with other proposed venting/MW/RF systems, this configuration ensures that the MW/RF heating and vapor flow are concentrated within the zone of soil contamination. Other proposed in situ soil decontamination schemes rely on the natural moisture content of soils. As the soil is heated, the soil moisture evaporates, and subsequently a drying front propagates through the soil, away from the MW/RF sources. As the soil dries, the efficiency of the heating operation decreases rapidly because the MW/RF heating process is significantly less efficient in dry soils. The obtainable clean-up levels are directly related to the ratio of the contamination level/soil moisture content. For soils contaminated with crude oil or other heavy hydrocarbons at levels greater than 100 ppm, there is not enough moisture naturally in the soil to ensure an efficient and effective remediation with MW/RF heating. For these reasons, the injection and control of moist air flow through the zone of interest must be maintained.

Referring now to FIG. 1, a region of contaminated soil 10 is traversed from the earth's surface 12 by one or more injection wells 14 and one or more extraction wells 16. Each of the wells 14,16 is screened, such as by perforations or other well-known means, over intervals 14' and 16' respectively which include only the contaminated zone 10. The wells 14,16 may be formed by driving perforated pipes into the ground. The wells 14,16 may also be drilled, cased, cemented and perforated as with conventional oil or gas wells. The terms "screened" or "perforated" include any such well. The injection wells 14 are preferably located outside, i.e., on the periphery of, the contaminated zone 10 while the extraction wells 16 are located within the contaminated zone 10. Moist, clean, warm air 35 from vapor treatment system 20 (to be subsequently described) is injected under pressure through conduits 22 into the injection wells 14 and forced thereby through the screened interval 14'. A vacuum is imposed on the extraction wells 16 by vacuum system 17 thereby drawing the flushing vapor flow 24 through the contaminated zone 10, through the screened interval 16' of extraction well 16, through conduit 22' and into the vapor treatment system 20. The vapors 24 flowing in the extraction well 16 are contaminated by virtue of being driven through the contaminated zone 10 and entraining a portion of the contaminants therein. The contaminated vapor 24 drawn by vacuum system 17 is transported through conduit 22' to the vapor treatment system 20 where it is treated (by a process to be later described) and the cleansed vapor emerges therefrom as moist, warm air 35 in conduits 22 for recycling to injection wells 14. MW/RF sources 26, 26' are located at or in the earth's surface 12 and are energized by sources well known to those skilled in the art of MW/RF heating. The MW/RF system preferably is an above-ground horizontal array and uses the induction or eddy current principle as disclosed in the previously mentioned copending application Ser. No. 444,574 which is incorporated herein by reference. The MW/RF system may also utilize in-situ vertical electrodes. The heat generated by the MW/RF sources 26,26' is conducted through the earth and into the contaminated region 10 thereby enhancing volatilization of contaminants therein and further driving them to the screened interval 16'. The MW/RF system operates preferably in the frequency range of 2 Mhz to 4 Ghz.

Figure 2:
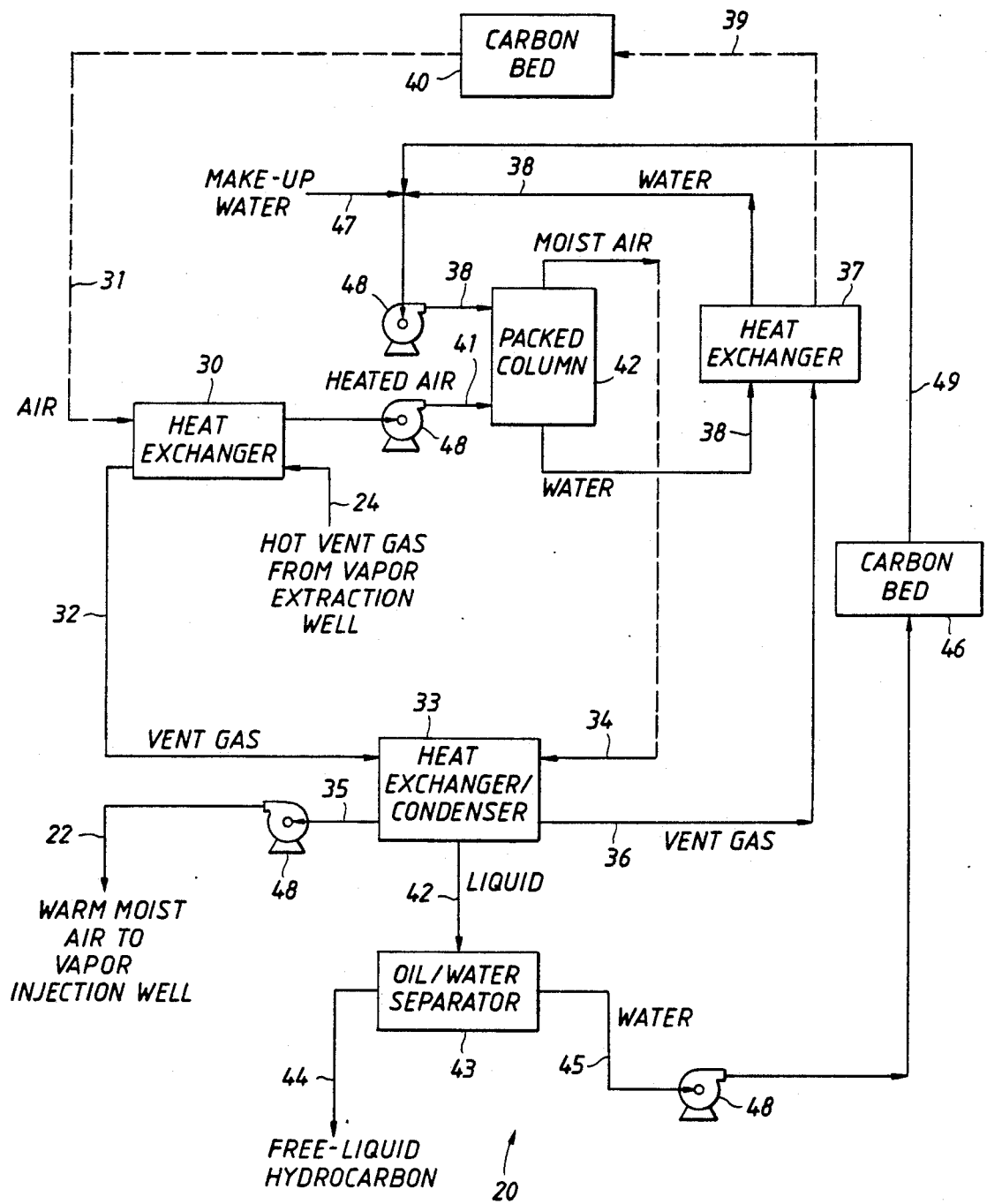
FIGS. 2 and 3 are block diagrams of alternate treatment systems.
Figure 3:
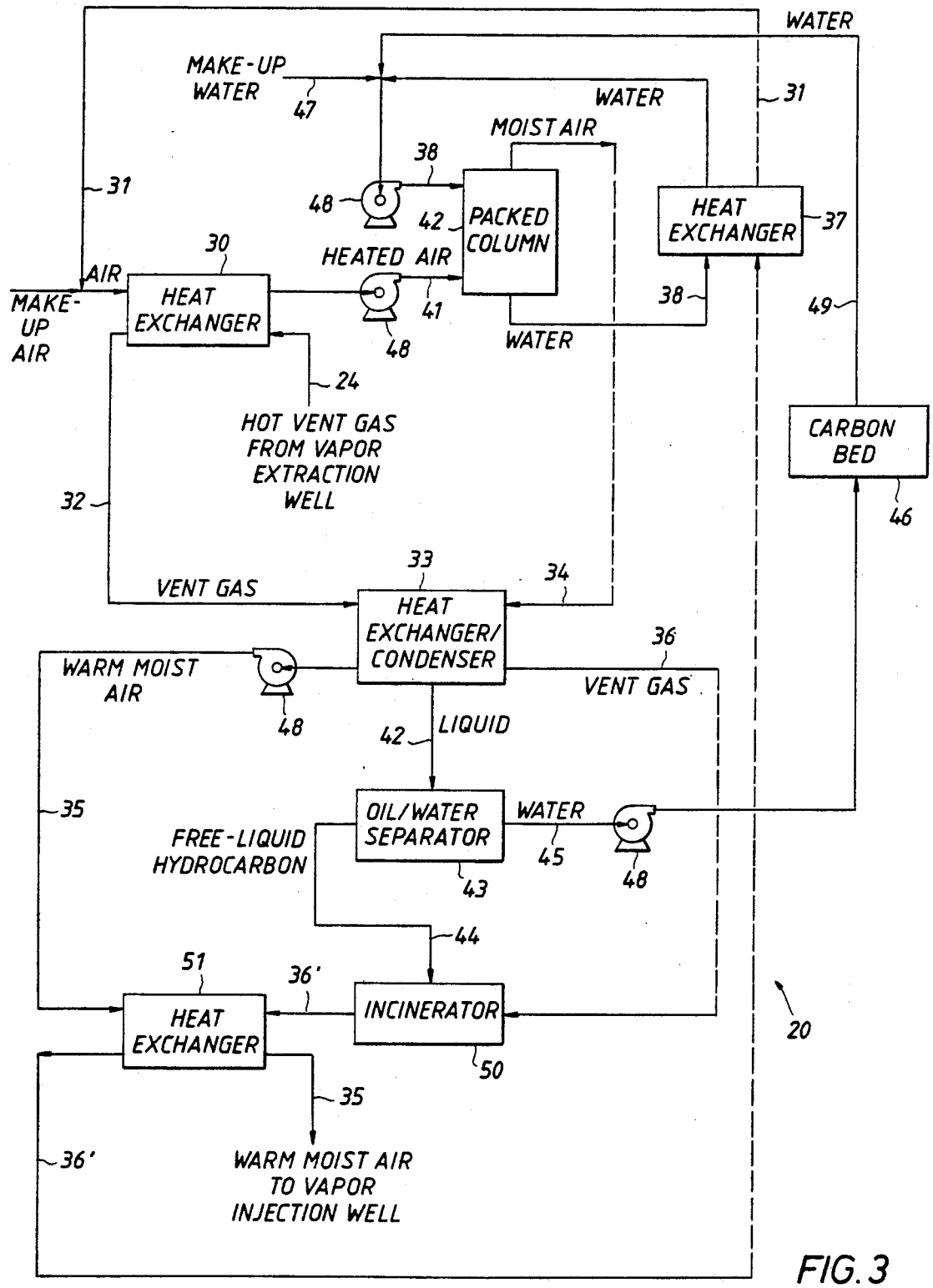

Referring now to FIGS. 2 and 3, the vapor treatment system 20 operates as follows:

FIG. 2 is a schematic of the above-ground vapor treatment moist air generating system 20 which utilizes the energy that is removed from the subsurface contaminated soil 10 in the vapor stream 24 while removing the contaminants therefrom and provides clean, moist, warm air 35 for reinjection into wells 14.

The moist air/contaminated vapors 24 drawn from the vapor extraction well 16 by vacuum system 17 enter vapor treatment system 20 and are passed through heat exchanger 30 in order to cool this stream and transfer the heat to the clean air stream 31 (to be subsequently described). The effluent, cooled extraction well gas stream 32 then passes through another heat exchanger 33 where it is cooled to a temperature low enough to condense contaminants and water vapor. The energy removed from this stream is used to heat clean moist air stream 34 that is then reinjected into the subsurface via injection well 14 as stream 35 through conduit 22.

The cooled effluent vapor stream 36 emerging from heat exchanger/condenser 33 then passes through heat exchanger 37 where heat is exchanged with water recycle stream 38. The effluent vapor stream 39 from heat exchanger 37 then passes through carbon bed 40 to remove any remaining contaminants and emerges as clean air stream 31. After passing through heat exchanger 30, where it is warmed by vapor stream 24 (as discussed above), the clean air stream 31 emerges as heated air 41 and is humidified in packed column 42 by contacting with water recycle stream 38. The resultant water-saturated vapor stream 34 emerging from packed column 42 is then warmed in heat exchanger 33 by vapor stream 24 (32) (as discussed above), emerging and being reinjected into the subsurface as clean, warm, moist air stream 35 in conduit 22.

Condensate 42 from heat exchanger 33 enters oil/water separator 43 where free-liquid contaminants 44 and water stream 45 are separated. The contaminant liquid 44 is then removed and disposed of. The water stream 45 is pumped through carbon bed 46 to remove any soluble contaminants, and then the output 49 of carbon bed 46 is combined with make-up water 47 and recycle stream 38, and then pumped into the air humidifier packed-column 42 for contacting with heated air 41.

To facilitate operation of the system, pumps 48 are distributed throughout the system. The placement, and number may vary as required.

FIG. 3 is a schematic of an alternate vapor treatment/heat recovery system 20 which operates in a manner similar to the system described above. The main difference is that free-liquid hydrocarbon 44 collected in oil/water separator 43 is used as fuel for a vapor incinerator 50, which destroys any remaining vapor-phase contaminants in vapor stream 36 and eliminates the need for the carbon bed 40 in FIG. 2. Heat exchanger 51 has been added to utilize the heat removed from the incinerator in stream 36' to further warm the moist clean air 35 prior to its reinjection into the subsurface through conduit 22 and injection well 14.

What is claimed is:

1. A system for the in situ decontamination of a zone of contaminated soil in a spill or landfill comprising:

a. an injection well located outside said contaminated zone but traversing at least the entire depth of said contaminated zone;
   b. perforations in said injection well corresponding only to the thickness of said contaminated zone;
   c. means for injecting a vapor into said injection well whereby said vapor is forced through said perforations in said injection well;
   d. an extraction well traversing said contaminated zone, said well having perforations only through the thickness of said contaminated zone;
   e. means for pulling a vacuum in said extraction well whereby said vapors will be drawn from said injection well, through said contaminated zone and into said extraction well thereby flushing and cleansing contaminants from said contaminated zone;
   f. means connected to the outlet of said extraction well for treating said contaminated vapors and recycling said treated vapor to said injection well; and
   g. means for heating the surface above said contaminated zone thereby enhancing volatilization of said contaminants in said contaminated zone.

2. The system of claim 1 wherein said contaminants are non-volatile hydrocarbons.

3. The system of claim 1 wherein said injection well comprises a plurality of injection wells located around the periphery of said contaminated zone.

4. The system of claim 1 wherein said extraction well comprises a plurality of extraction wells.

5. The system of claim 1 wherein said injection well comprises a cased, cemented well perforated only in the contaminated zone.

6. The system of claim 1 wherein said extraction well comprises a cased, cemented well perforated only in the contaminated zone.

7. The system of claim 1 wherein said injected vapor is clean, moist, warm air.

8. The system of claim 1 wherein said means for heating is a microwave or radio frequency system.

9. The system of claim 8 wherein said system operates in the frequency range of 2 Mhz to 4 Ghz.

10. The system of claim 9 wherein said system operates on the eddy current or induction principle.

11. A method of in situ decontamination of a zone of contaminated soil in a spill or landfill comprising the steps of:

a. injecting a vapor into an injection well, said well being located outside said contaminated zone but which traverses at least the entire depth of said contaminated zone, said injection well being perforated only through the thickness of said contaminated zone;
   b. forcing said vapor through said contaminated zone and into an extraction well, said well being located within said contaminated zone and traversing said contaminated zone, said extraction well also having perforations only through the thickness of said contaminated zone whereby said vapor is forced through said perforations in said injection well, through said contaminated zone, thereby flushing and entraining contaminants therefrom, and through said perforations and into said extraction well;
   c. treating said contaminated vapor and recycling said treated vapor to said injection well; and d. heating the earth's surface above said contaminated zone thereby enhancing volatilization of said contaminants in said contaminated zone.

12. The method of claim 11 wherein said contaminants are non-volatile hydrocarbons.

13. The method of claim 11 wherein said injection well comprises a plurality of injection wells located around the periphery of said contaminated zone.

14. The method of claim 11 wherein said extraction well comprises a plurality of extraction wells.

15. The method of claim 11 wherein said injection well comprises a cased, cemented well perforated only in the contaminated zone.

16. The method of claim 11 wherein said extraction well comprises a cased, cemented well perforated only in the contaminated zone.

17. The method of claim 11 wherein said injected vapor is clean, moist, warm air.

18. The method of claim 11 wherein said means for heating is a microwave or radio frequency system.

19. The method of claim 18 wherein said system operates in the frequency range of 2 Mhz to 4 Ghz.

20. The method of claim 19 wherein said system operates on the eddy current, or induction, principle.

* * * * *